(12) United States Patent
Chickering et al.

(10) Patent No.: US 7,342,582 B2
(45) Date of Patent: Mar. 11, 2008

(54) SYSTEM AND METHOD FOR VISUALIZATION OF CATEGORIES

(75) Inventors: David Maxwell Chickering, Bellevue, WA (US); Zhaohui Tang, Bellevue, WA (US); David Earl Heckerman, Bellevue, WA (US); Robert L. Rounthwaite, Fall City, WA (US); Alexei V. Bocharov, Redmond, WA (US); Scott Conrad Oveson, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/954,743

(22) Filed: Sep. 30, 2004

(65) Prior Publication Data

US 2005/0041027 A1    Feb. 24, 2005

Related U.S. Application Data

(62) Division of application No. 10/185,081, filed on Jun. 28, 2002.

(51) Int. Cl.
*G06T 11/20* (2006.01)
(52) U.S. Cl. .................. 345/440; 707/100
(58) Field of Classification Search ............ 345/440
See application file for complete search history.

(56) References Cited

U.S. PATENT DOCUMENTS 5,880,742 A * 3/1999 Rao et al. ............... 345/440

6,216,134 B1 * 4/2001 Heckerman et al. ..... 707/104.1

OTHER PUBLICATIONS

De Pompa, Barbara, "IBM to Help Data Miners", *Informationweek*, Apr. 1, 1996, http://techweb.cmp.com/iw, 573, 32.
Edelstein, H., "Mining Data Warehouses", *Informationweek*, Jan. 8, 1996, 561, http://techweb.cmp.com/iwk, 48-51.
Fogarty, K., "Data Mining can Help to Extract Jewels of Data", *Network World*, 1994, 11(23), 40-43.
Hoffman, T. et al., "Data Mining Unearths Customers", *Computerworld*, 1995, 29(28), 1, 28.
Myers, M., "For Information Harvesting, the future is now", *Network World Fusion*, 1995, http://nwfusion.com/archive/, 12(21), 42.
Richman, D., "Data Mining Chisels its Niche", *Computerworld*, Jan. 29, 1996, 30(5), 49.

* cited by examiner

*Primary Examiner*—Kee M. Tung
*Assistant Examiner*—Michelle K Lay
(74) *Attorney, Agent, or Firm*—Woodcock Washburn LLP

(57) ABSTRACT

Distribution displays for categories are provided which illuminate the distribution of continuous attributes over all cases in a category, and which provide a histogram of the population of the different states of categorical attributes. An array of such displays by attribute (in one dimension) and category (in another dimension) may be provided. Category diagram displays are also provided for visualizing the different categories, and their distributions, populations, and similarities. These are displayed through different shading of nodes and edges representing categories and the relationship between two categories, and through proximity of nodes.

3 Claims, 8 Drawing Sheets

CALCULATE A DISTRIBUTION OF VALUES OF A CONTINUOUS ATTRIBUTE
610

DISPLAY THE DISTRIBUTION AS A DIAMOND AND BAR, WHERE THE SHAPE AND PLACEMENT OF THE DIAMOND ON THE BAR REPRESENTS THE DISTRIBUTION
620

```
┌─────────────────────────────────┐
│  DISPLAY CATEGORIES AS OBJECTS, │
│ WITH EDGES CONNECTING EACH PAIR │
│          OF OBJECTS             │
│              910                │
└─────────────────────────────────┘
                 │
                 ▼
┌─────────────────────────────────┐
│   ACCEPT A STATE OF A CATEGORICAL│
│  ATTRIBUTE, A VALUE OR RANGE OF A│
│     CONTINUOUS ATTRIBUTE, A     │
│   POPULATION DISPLAY REQUEST, A │
│  SIMILARITY DISPLAY REQUEST, OR A│
│       CATEGORY FOCUS REQUEST    │
│              920                │
└─────────────────────────────────┘
                 │
                 ▼
┌─────────────────────────────────┐
│     CALCULATE DISTRIBUTIONS,    │
│ POPULATIONS OR SIMILARITIES BASED│
│           ON REQUEST            │
│              930                │
└─────────────────────────────────┘
                 │
                 ▼
┌─────────────────────────────────┐
│    SHADE OBJECTS AND EDGES TO   │
│    REFLECT CALCUATED DATA       │
│              940                │
└─────────────────────────────────┘
```

FIG. 9

SYSTEM AND METHOD FOR VISUALIZATION OF CATEGORIES

CROSS-REFERENCE TO RELATED CASES

This is a divisional of U.S. patent application Ser. No. 10/185,081, entitled "System and Method for Visualization of Categories," filed on Jun. 28, 2002.

FIELD OF THE INVENTION

The present invention relates to user interfaces, and more specifically, to user interfaces for the visualization of categories of data.

BACKGROUND OF THE INVENTION

Computer systems have long been used for data analysis. For example, data may include demographics of users and web pages accessed by those users. A web master (i.e., a manager of a web site) may desire to review web page access patterns of those users in order to optimize links between various web pages or to customize advertisements to the demographics of the users. However, it may be very difficult for the web master to analyze the access patterns of thousands of users involving possibly hundreds of web pages. However, this difficulty may be lessened if the users can be categorized by common demographics and common web page access patterns.

Two techniques of data categorization—classification and clustering—can be useful when analyzing large amounts of such data. These categorization techniques are used to categorize data represented as a collection of records, each containing values for various attributes. For example, each record may represent a user, and the attributes describe various characteristics of that user. The characteristics may include the sex, income, and age of the user, or web pages accessed by the user. Each record, together with all its attributes, is commonly referred to as a "case".

Classification occurs when each record has a "class" value, and an attempt is made to predict that value given other values in the record. For example, records corresponding to a user may be classified by gender given income, age, and web pages accessed. However, certain records may have attributes that indicate similarity to more than one class. Therefore, some classification techniques, and more generally some categorization techniques, assign a probability that each record is in each class.

Clustering techniques provide an automated process for analyzing the records of the collection and identifying clusters of records that have similar attributes. For example, a data analyst may request a clustering system to cluster the records into five clusters. The clustering system would then identify which records are most similar and place them into one of the five clusters. Also, some clustering systems automatically determine the number of clusters.

Once the categories (classes or clusters) are established, the data analyst can use the attributes of the categories to guide decisions. For example, if one category represents users who are mostly teenagers, then a web master may decide to include advertisements directed to teenagers in the web pages that are accessed by users in this category. However, the web master may not want to include advertisements directed to teenagers on a certain web page if users in a different category who are senior citizens who also happen to access that web page frequently. Even though the categorization of the collection may categorize the data from thousands of records by sorting those records into 10 or 20 summary buckets, a data analyst still needs to review the data in these buckets. The data analyst still needs to understand the similarity and dissimilarity of the records in the categories so that appropriate decisions can be made.

With the rapid and burgeoning deployment of electronic commerce web sites, web site owners have realized that voluminous consumer data gathered and provided through such a site, and particularly its electronic commerce server, provides a wealth of useful information. Additionally, traditional commercial means (including so called "bricks-and-mortar stores") also often incorporate and use systems that collect customer information. By analyzing customer data from whatever source, consumer buying patterns can be discerned. Targeted advertising, even to the point of directed targeted advertising to a particular individual based on that person's particular buying habits and/or interests, can be rendered. Such targeted advertising generally yields significantly higher response rates and improved user experiences over that resulting from traditional mass media advertising and at significantly lower costs to the vendor. Similarly, other types of data may be analyzed, and uses other than commercial uses are possible.

Yet, a practical difficulty has arisen. While both cluster models and classification models can be extracted from data, such as on-line consumer transaction data, through well-known conventional machine-learning techniques, it has proven to be rather difficult to present category data in a simple meaningful and easily understood manner, for example, to a business manager who is making marketing or other decisions based on that data. Generally, in the past, category data was simply provided as textual lists, that typically listed a number of consumers in each category and an associated probabilistic or other numeric measure (collectively "metrics") associated with each user and each category. These users and categories could then be compared against each other through assessing their metrics to discern trends or other information of interest.

However, textual data, particularly if it is voluminous, which is very often the case with consumer purchasing data, is extremely tedious to quickly comprehend (i.e., "digest") particularly when looking for trends or other relationships that are "hidden" in the data. Furthermore, while conventional categorization techniques are rather effective in categorizing the data, based on discerned relationships amongst different cases in the data (a case being a single record with all its associated attribute data, as discussed above), oftentimes the resulting clusters are simply mathematical constructs in a flat list. The resulting categories provide little, if any and often no, physically discernible basis in reality, i.e., the qualitative meaning and physical distinctions (apart from differences in mathematical metrics) between different categories are unclear, if not very difficult, to comprehend. In essence, the question of "What do the categories represent?" can become very difficult for the data analyst to answer. Hence, useful distinctions effectively become lost in the results, thus frustrating not only a data analyst who is then working with that data but also ultimately a business manager who, in an effort to reduce business risk, may need to make costly marketing and sales decisions, such as how to effectively market a given product and to whom and when, based on that data.

Given the difficulty associated with assessing text-based categorization results, various techniques have been developed in the art for visualizing clustered data, and particularly its classifications, in an attempt to facilitate and aid, e.g., the analyst or business manager in extracting useful relationships from the data.

A basic need of any such visualization system is to provide category information in a manner that allows its viewer to readily appreciate essential differences between the cases in a cluster, i.e., those distinctions that characterize the data. Thus far, the visualization tools available in the art for depicting clusters and their inter-relationships have proven to be quite deficient in practice in meeting this need, particularly, though certainly not exclusively, when utilized in an electronic commerce setting.

Thus, there is a need for a cluster or classification visualization tool that properly addresses and satisfies heretofore unfilled needs in the art. Such a tool is particularly, though certainly not exclusively, suited for use in servers designed to support electronic commerce.

SUMMARY OF THE INVENTION

In view of the foregoing, the present invention provides systems and methods for a cluster visualization tool that allows information about categories (clusters or classes) to be presented in an understandable display.

Distribution Displays

The present invention provides a display for viewing the distribution of a continuous attribute within the cases included in a category as a diamond and bar display. In one embodiment of the invention, a tool tip or dialog box is provided which shows the details of the distribution when the user requests these details, for example by moving a pointer over areas of the display or by clicking on areas of the display. In one embodiment, a marginal distribution display is also provided which provides details about the distribution of a continuous attribute over all cases in the data set as a diamond and bar display.

Additionally, the present invention provides a rectangular histogram display for viewing the distribution of states of a categorical attribute within the cases included in a category. In one embodiment of the invention, a tool tip or dialog box is provided which shows the details of the distribution when the user requests these details, for example by moving a pointer over areas of the display or by clicking on areas of the display. In one embodiment, a legend display is provided which displays a rectangle histogram corresponding to a uniform distribution of the states in the categorical attribute. In one embodiment, a marginal distribution display is also provided which provides details about the distribution of a categorical attribute over all cases in the data set as a rectangular histogram display.

The present invention provides a display in which the distribution of states of at least two attributes in at least two categories is shown. This display allows a user to sort the attributes by expected distribution score for a given category.

Category Diagram Displays

The present invention provides a category diagram display in which categories are represented graphically as node objects in a display.

In one embodiment, a state of a categorical attribute may be selected, and the nodes are shaded such that shading corresponds to the probability of the selected state of the categorical attribute in the data in the category represented by the node. In one embodiment, the darkest shading corresponds to a probability of 1 and the lightest to a probability of 0.

In another embodiment, a value for a continuous attribute may be selected, and the nodes are shaded such that shading corresponds to the density at that value of the continuous attribute in the data in the category represented by the node. In another embodiment, a range for a continuous attribute may be selected, and the nodes are shaded such that shading corresponds to the probability of the value of the continuous attribute in the data in the category represented by the node falling in that range.

In another embodiment, the nodes are shaded such that shading corresponds to the population in the category represented by the node. In one embodiment, the darkest possible shading corresponds to the total population in the data set. In another embodiment, the darkest possible shading corresponds to the population of the largest category.

In another embodiment, edges connect the nodes in the category diagram, and the edges are shaded such that the shading of an edge corresponds to the level of similarity between the categories represented by the nodes connected by the edge. In one embodiment, the shading is in proportion to the value of the similarity score relative to the minimum and maximum similarity scores for any two nodes in the category diagram. In one embodiment, a minimum similarity may be selected, and only edges that connect nodes representing categories with a similarity greater than the minimum similarity are displayed. In another embodiment, a category may be selected, and the edges incident to the node representing the category are shaded in a different color than other edges. In another embodiment, when a category is selected, only the edges incident to the node representing that category are displayed, and the minimum shading is set to correspond to the smallest similarity between that category and any other category, and the maximum shading is set to correspond to the highest similarity between that category and any other category.

In another embodiment, the nodes in the category diagram are positioned using a charge-and-spring layout, where more similar categories are drawn in closer proximity to each other and less similar categories are drawn further from each other.

BRIEF DESCRIPTION OF THE DRAWINGS

The system and methods for using high-cardinality attributes in decision trees in accordance with the present invention are further described with reference to the accompanying drawings in which:

FIG. 9 is a block diagram showing the method of category diagram display of category data according to one embodiment of the invention.

DETAILED DESCRIPTION OF THE INVENTION

Overview

As described in the background, conventionally, tools for analyzing category data are not capable of providing useful visual information about categories and their inter-relationships.

Distribution displays for categories are provided which illuminate the distribution of continuous attributes over all cases in a category, and which provide a histogram of the population of the different states of categorical attributes. An array of such displays by attribute (in one dimension) and category (in another dimension) may be provided in order to provide an easy method of comparison of distributions of an attribute between categories, and to provide an easy method of comparison of the distributions of all attributes in a category.

Category diagram displays are also provided. These diagrams provide a method for visualizing the different categories, and their distributions, populations, and similarities. These are displayed by using different shading of nodes representing categories to display the differences between the nodes in terms of distributions of a certain state of a categorical attribute or a certain value or range of a continuous attribute. Shading of nodes may also indicate differences in population numbers of the categories.

Edges drawn between the nodes may be shaded differently to show differing levels of similarity between the categories represented by the nodes. Category diagram displays may also be drawn based on a charge-and-spring layout algorithm, in which the layout attempts to place nodes in proximity to each other based on their similarities.

Exemplary Computing Environment

Figure 1:
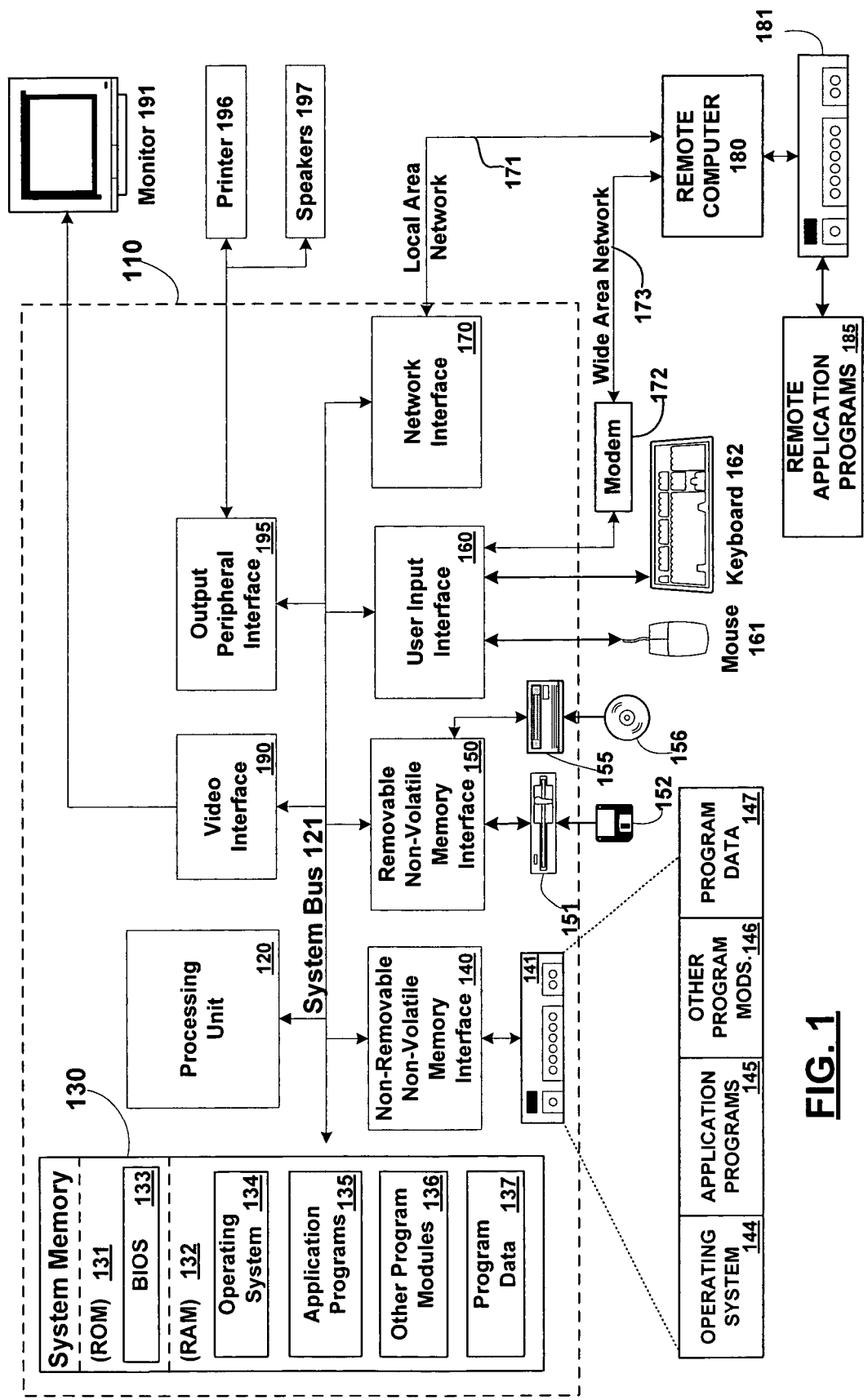
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices. Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the techniques of the present invention.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be used to store the desired information and that can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Distribution Displays—Continuous Attributes

Once case data has been divided into various categories, the categories can be examined with reference to a specific attribute and a distribution display relative to that attribute can be produced according to one embodiment of the invention.

An attribute of a case may be a continuous attribute. The value of a continuous attribute for a case will not be one of a limited number of states, but instead, is a value from within a range of possible values. For example, if cases represent customers, one possible attribute may be amount spent. Each case will have a value assigned to it for the amount spent attribute.

Figure 6:
FIG. 6 is a block diagram showing the method of display preparation for a continuous attribute according to one embodiment of the invention.

For the cases contained in a category, the distribution of the values for a continuous attribute is determined, as shown in FIG. 6, step 610. In one embodiment, this distribution is a Gaussian distribution and the calculation of the distribution will provide a mean and a standard deviation. Other techniques for determining the technique are possible, and the use of these techniques is also contemplated in alternate embodiments. One of these is a conditional log-Gaussian distribution. In such a distribution, the deviation above the mean may be different from the distribution below the mean.

Figure 2:
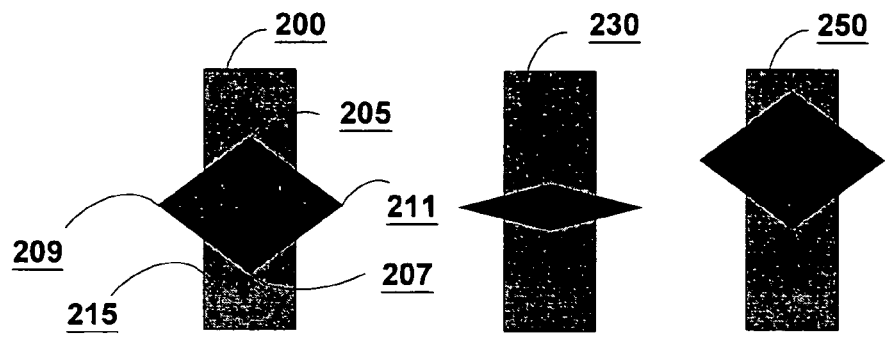
FIG. 2 is a diagram showing three distribution displays for a continuous attribute according to one embodiment of the invention.

After a mean and a standard deviation is calculated, it is displayed as a diamond and bar display, step 620. As shown in FIG. 2, this diamond (rhombus) and rectangular bar display 200 graphically displays the distribution. The centerline of the rhombus that runs from the top vertex 205 to the bottom vertex 207 is parallel to the long edges of the bar, including edge 215. The centerline of the rhombus that runs from the left vertex 209 to the right vertex 211 represents the mean. In order two compare the means of the distributions of two categories, the position of this centerline on the bar can be compared. For example, in FIG. 2., it can be seen that the horizontal centerline in display 200 is in the same position as the horizontal centerline in display 230. The categories corresponding to these two displays have equal means for the continuous attribute being displayed. The horizontal centerline in display 250 is higher than the horizontal centerline in display 200. The category corresponding to the display 250, therefore, has a higher mean value than the category corresponding to display 200.

According to one embodiment, the standard deviation is also represented in the diamond and bar display. The position of top vertex 205 corresponds to plus one standard deviation from the mean for the category. The position of the bottom vertex 207 corresponds to minus one standard deviation from the mean. In another embodiment, the top vertex corresponds to minus one standard deviation from the mean, and the bottom vertex to plus one standard deviation from the mean. The standard deviation in display 230 is smaller than that in display 200. The category corresponding to display 230, therefore, has the same mean value but a smaller standard deviation than the category corresponding to display 200. The shape of the rhombus in display 250 is the same as the shape of the rhombus in display 230. The category corresponding to display 250 has the same standard deviation (but, as described above, a higher mean value) than the category corresponding to display 200.

The bar itself is used to measure these values. In a preferred embodiment, the distribution for the attribute over all cases is calculated. The middle of the bar corresponds to the mean over all cases, and the top and bottom of the bar correspond to plus and minus three standard deviations.

When the user brings a cursor over the display, details of the distribution are displayed in a tool-tip box. When a user clicks on the display, an enlarged version is displayed. In one embodiment, a legend is provided for the continuous attribute. This legend shows the diamond and bar display for the distribution of a continuous attribute over all cases in the data set.

Distribution Displays—Categorical Attributes

An attribute of the case may also be a categorical attribute. The value for this type of attribute will be one of a specified set of states. For example, the attribute may be educational level, and the states may be {high school, bachelor's degree, graduate degree). For each case, the value of the educational level attribute will be one of these states.

Figure 3:
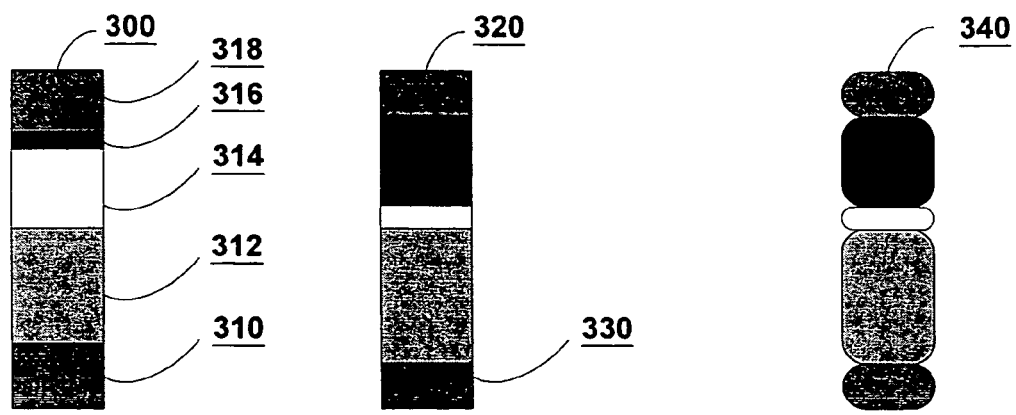
FIG. 3 is a diagram showing two distribution displays for a categorical attribute according to one embodiment of the invention.
Figure 7:
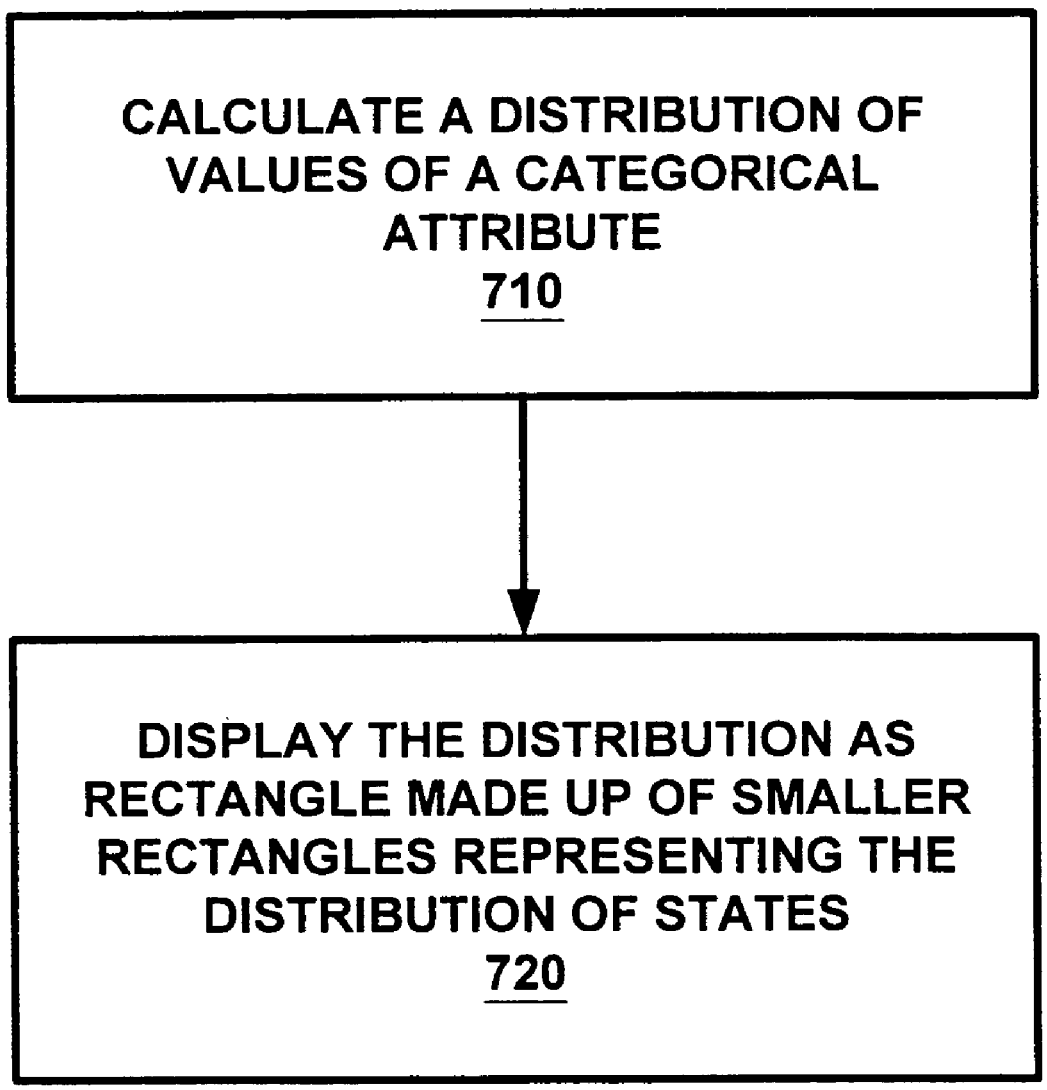
FIG. 7 is a block diagram showing the method of display preparation for a categorical attribute according to one embodiment of the invention.

For the cases in a category, the distribution is determined by calculating a level of support for each state. This is shown in FIG. 7, step 710. This level of support will correspond to the number of cases in the category with the given state divided by the total number of cases in the category. A histogram display is then created, step 720. As shown in FIG. 3, once a level of support is calculated for each state, a rectangular histogram display 300 is produced in order to graphically display the distribution. The display 300 is a rectangle comprised of smaller rectangles 310, 312, 314, 316, and 318. Each of these corresponds to a state of the categorical attribute. The area of these rectangles for each state is proportional to the support for the state in the category.

When two displays for one attribute are created, the states should be displayed in the same order. For example, in display 320, the small rectangle 330 corresponds to the same state that small rectangle 310 corresponds to in display 300. Small rectangles that correspond to the same state in different displays may be labeled, shaded or colored similarly, in order to aid comprehension.

A user-changeable maximum number of displayable states value N is provided. This value controls how many states are displayed on the displays. The N states with the most support, that is, the states that occur in the most cases within the given category, are displayed. In one embodiment, an additional small rectangle is included which represents all other states cumulatively. If the displays include color coding for states, the rectangle which represents all other states cumulatively may be colored grey. This maximum number N may be dynamically changed based on the distribution, the size of the display, or user input.

When the user brings a cursor over the display, details of the distribution are displayed in a tool-tip box. When a user clicks on the display, an enlarged version is displayed. In one embodiment, a legend is provided for the categorical attribute. This legend shows the rectangular histogram display for the distribution of a categorical attribute over all cases in the data set. In another embodiment, a legend is provided which displays equal support for all states in the categorical attribute.

The rectangle histogram display technique may also be used for a continuous attribute that has been discretized into a number of attributes. When this is the case, for the a histogram display for a discretized attribute 340 the small rectangles making up the histogram display in one embodiment have rounded edges. These rounded edges, together with any textual information describing the state as encompassing a range, will alert the user that the attribute being displayed via the histogram display is a discretized continuous attribute.

Figure 4:
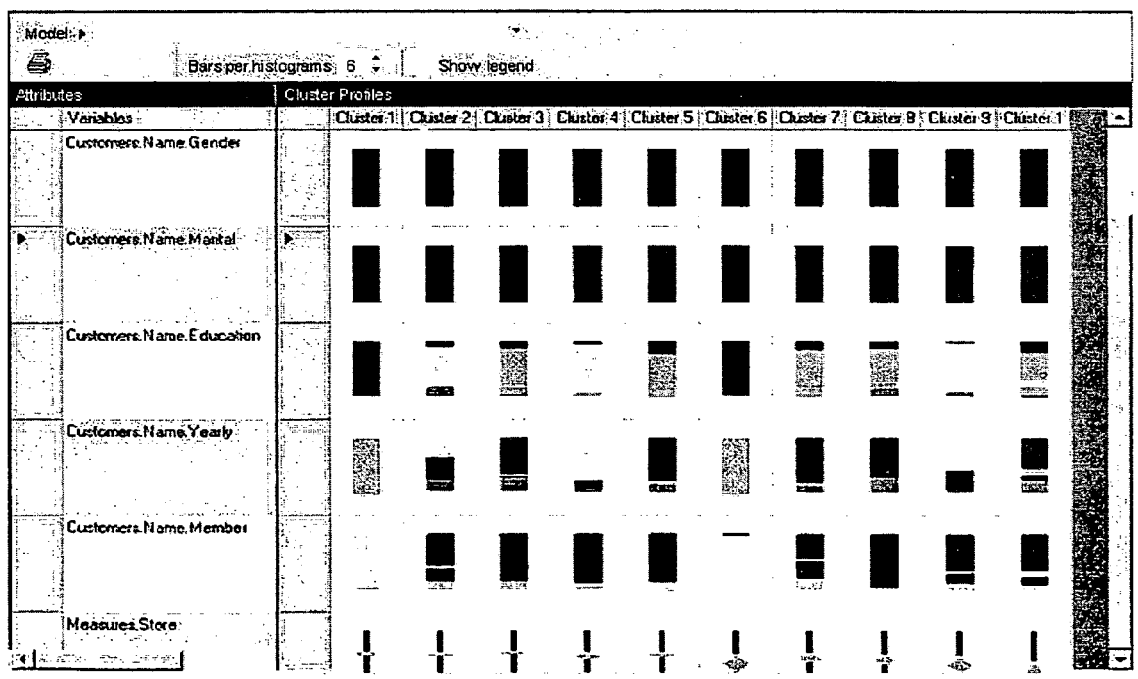
FIG. 4 is a diagram showing an array of distribution displays according to one embodiment of the invention.
Figure 8:
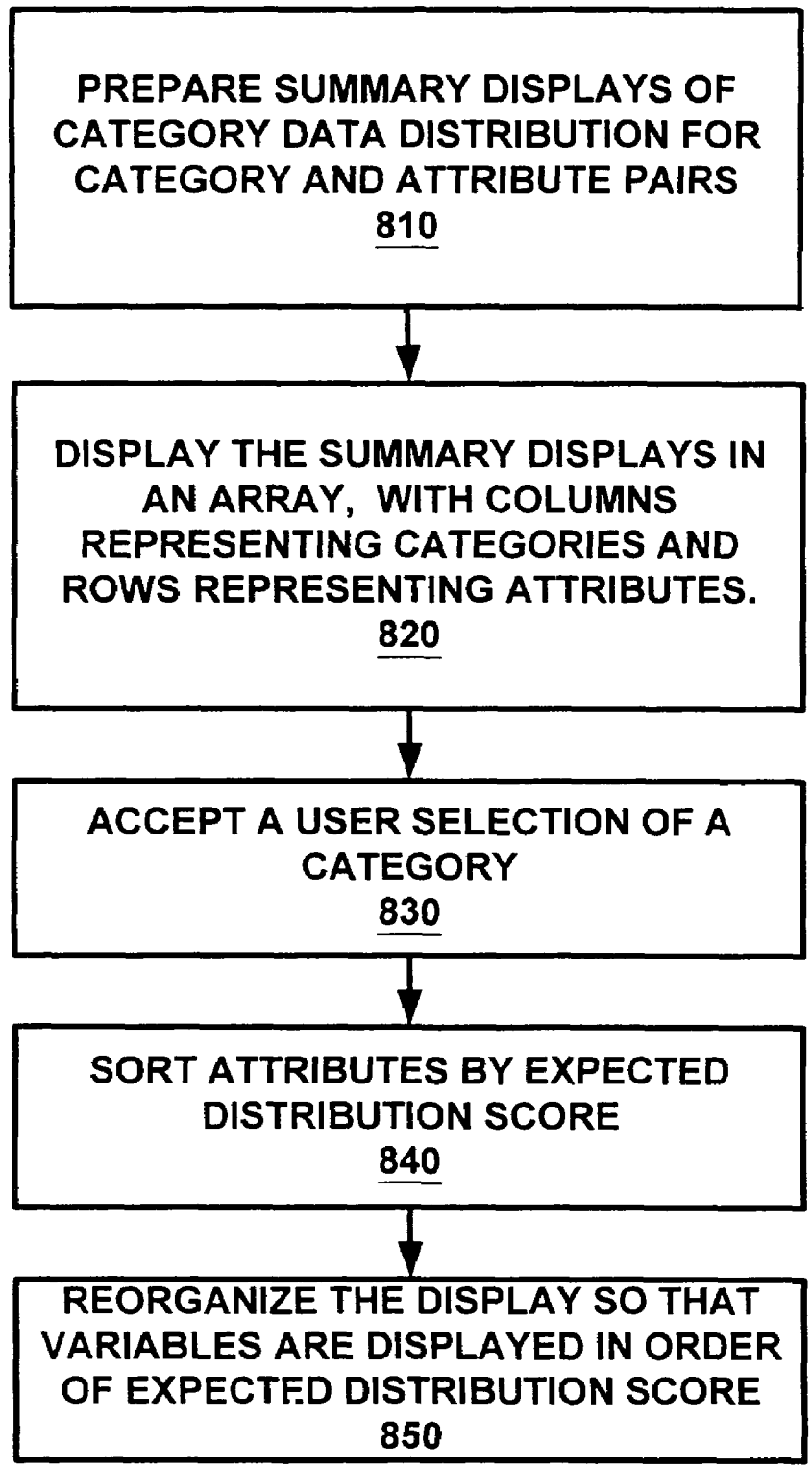
FIG. 8 is a block diagram showing the method of summary display of category data according to one embodiment of the invention.

In one embodiment, as shown in FIG. 4, distribution displays are prepared for a number of categories and attributes, one for each category and attribute pair. See FIG. 8, step 810. These are then displayed in an array, step 820. Each of the rows corresponds to a specific attribute, and each of the columns to a category. In one embodiment, the continuous attribute displays and categorical attribute displays described above are used. When a category is selected, step 830, the expected distribution score for the selected category is calculated, step 840. The rows are then rearranged so that the attributes are displayed in order based on the expected distribution score for the selected category, step 850. In this way, the attributes higher utility for a given category may be easily identified and examined.

Category Diagram Displays

Figure 5:
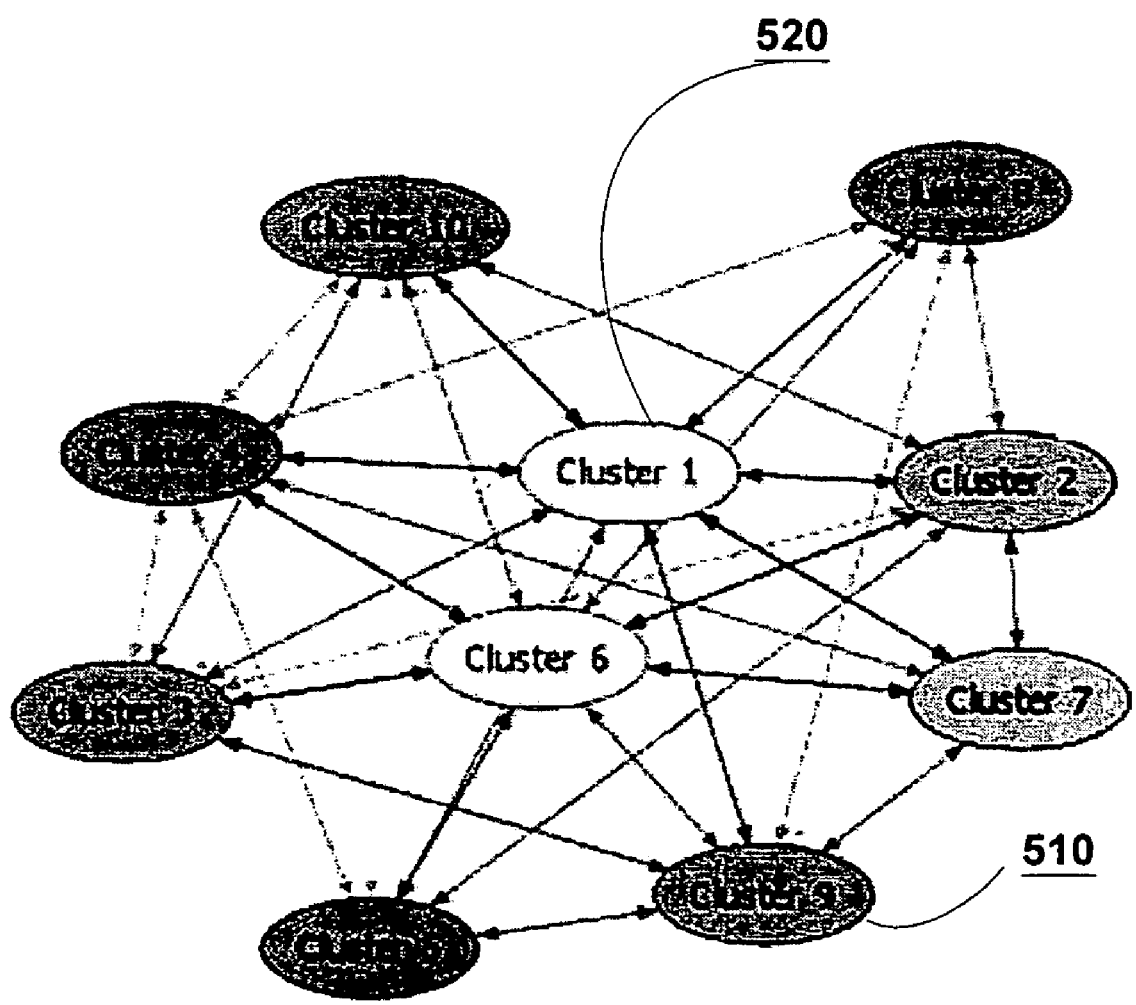
FIG. 5 is a diagram showing a category diagram display according to one embodiment of the invention.

As shown in FIG. 5 and in step 910 of FIG. 9, according to one embodiment of the present invention, a category diagram display is provided in which categories are represented graphically as node objects in a display. In FIG. 5, the categories are clusters. The user then may request that certain information about the categories be presented by submitting a request, step 920. Calculations are performed according to such a request, 930, and the objects and edges on the screen are then shaded to reflect information pertaining to the request made.

In one embodiment, a state of a categorical attribute may be selected. The nodes are then shaded. The shades correspond to the probability of the selected state of the categorical attribute in the data in the category represented by the node. Referring again to FIG. 5, for example, a darker shaded node such as Cluster 9 node 510 would represent a category in which the selected state has higher support than a node shaded more lightly, such as Cluster 1 node 520. In one embodiment, the darkest shading possible corresponds to a probability of 1 and the lightest to a probability of 0. In one embodiment, this darkest possible shading is black.

In one embodiment, a value for a continuous attribute is selected, and the nodes are shaded so that the shading corresponds to the density at that value of the continuous attribute in the data in the category represented by the node. In another embodiment, a range for a continuous attribute is selected, and the nodes are shaded such that shading corresponds to the probability of the value of the continuous attribute in the data in the category represented by the node falling in that range.

In another embodiment, instead of a distribution of an attribute, the population, or number of cases in the category, is shown. The nodes are shaded such that shading corresponds to the population in the category represented by the node. In one embodiment, the darkest possible shading corresponds to the total population in the data set. In another embodiment, the darkest possible shading corresponds to the population of the largest category.

As shown in FIG. 5, edges 520 connect the nodes in the category diagram. In one embodiment, the edges are shaded in various shadings. The shading of each edge corresponds to the level of similarity between the clusters represented by the nodes connected by the edge. In one embodiment, the shading is in proportion to the value of the similarity score relative to the minimum and maximum similarity scores for any two nodes in the category diagram.

In another embodiment, a minimum similarity may be selected, and only edges that connect nodes representing categories with a similarity greater than the minimum similarity are displayed.

In another embodiment, a category may be selected, and the edges incident to the node representing the category are shaded in a different color than other edges. In another embodiment, when a category is selected, only the edges incident to the node representing that category are displayed, and the minimum shading is set to correspond to the smallest similarity between that category and any other category, and the maximum shading is set to correspond to the highest similarity between that category and any other category.

The similarity of the categories may also be represented in position rather than shading. Each node is represented as a mutually repelling point charge and is linked to every other node by a spring whose strength is proportional to the similarity between the categories represented by the nodes. A layout algorithm is used which lays out the nodes in such a way as to try to simulate how such charges and springs would act.

CONCLUSION

Herein a system and method for display of category data. As mentioned above, while exemplary embodiments of the present invention have been described in connection with various computing devices and network architectures, the underlying concepts may be applied to any computing device or system in which it is desirable to create a decision tree. Thus, the techniques for creating a decision tree in accordance with the present invention may be applied to a variety of applications and devices. For instance, the techniques of the invention may be applied to the operating system of a computing device, provided as a separate object on the device, as part of another object, as a downloadable object from a server, as a "middle man" between a device or object and the network, as a distributed object, etc. While exemplary names and examples are chosen herein as representative of various choices, these names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for displaying category data, where a data set comprises information organized into a plurality of categories and a plurality of attributes, each attribute having a plurality of defined states, said method comprising:

calculating category data distribution information for each attribute of each category, the calculated category data distribution information defining the distribution of the attribute of the category across the plurality of defined states of such attribute;

preparing a summary display of said calculated category data distribution information for each attribute of each category, said summary display for each attribute of each category comprising a histogram having a plurality of rectangles corresponding to a state distribution of the defined states of the attribute of the category, each of the plurality of rectangles within the histogram corresponding to a particular one of the plurality of defined states of such attribute;

displaying said summary displays organized in two dimensions, organized by category in a first dimension and by attribute in a second dimension;

accepting a selection of one of the plurality of categories from a user;

calculating an expected distribution score for each attribute of the selected category;

sorting the attributes by calculated expected distribution score for said selected category; and reorganizing said summary displays so that said attributes are organized by said calculated expected distribution score for said selected category.

2. A computer-readable medium comprising computer-executable modules having computer-executable instructions for displaying category data, where a data set comprises information organized into a plurality of categories and a plurality of attributes, each attribute having a plurality of defined states, said modules comprising:

a module for calculating category data distribution information for each attribute of each category, the calculated category data distribution information defining the distribution of the attribute of the category across the plurality of defined states of such attribute;

a module for preparing a summary display of said calculated category data distribution information for each attribute of each category, said summary display for each attribute of each category comprising a histogram having a plurality of rectangles corresponding to a state distribution of the defined states of the attribute of the category, each of the plurality of rectangles within the histogram corresponding to a particular one of the plurality of defined states of such attribute;

a module for displaying said summary displays organized in two dimensions, organized by category in a first dimension and by attribute in a second dimension;

a module for accepting a selection of one of the plurality of categories from a user;

a module for calculating an expected distribution score for each attribute of the selected category;

a module for sorting the attributes by calculated expected distribution score for said selected category; and a module for reorganizing said summary displays so that said attributes are organized by said calculated expected distribution score for said selected category.

3. A computer device for displaying category data, where a data set comprises information organized into a plurality of categories and a plurality of attributes, each attribute having a plurality of defined states, said device comprising:

means for calculating category data distribution information for each attribute of each category, the calculated category data distribution information defining the distribution of the attribute of the category across the plurality of defined states of such attribute;

means for preparing a summary display of said calculated category data distribution information for each attribute of each category, said summary display for each attribute of each category comprising a histogram having a plurality of rectangles corresponding to a state distribution of the defined states of the attribute of the category, each of the plurality of rectangles within the histogram corresponding to a particular one of the plurality of defined states of such attribute;

means for displaying said summary displays organized in two dimensions, organized by category in a first dimension and by attribute in a second dimension;

means for accepting a selection of one of the plurality of categories from a user;

means for calculating an expected distribution score for each attribute of the selected category;

means for sorting the attributes by calculated expected distribution score for said selected category; and means for reorganizing said summary displays so that said attributes are organized by said calculated expected distribution score for said selected category.

* * * * *